Jan. 24, 1928.
C. A. WINSLOW
1,657,330
LIQUID LEVEL INDICATOR
Filed Dec. 4, 1923
2 Sheets-Sheet 1
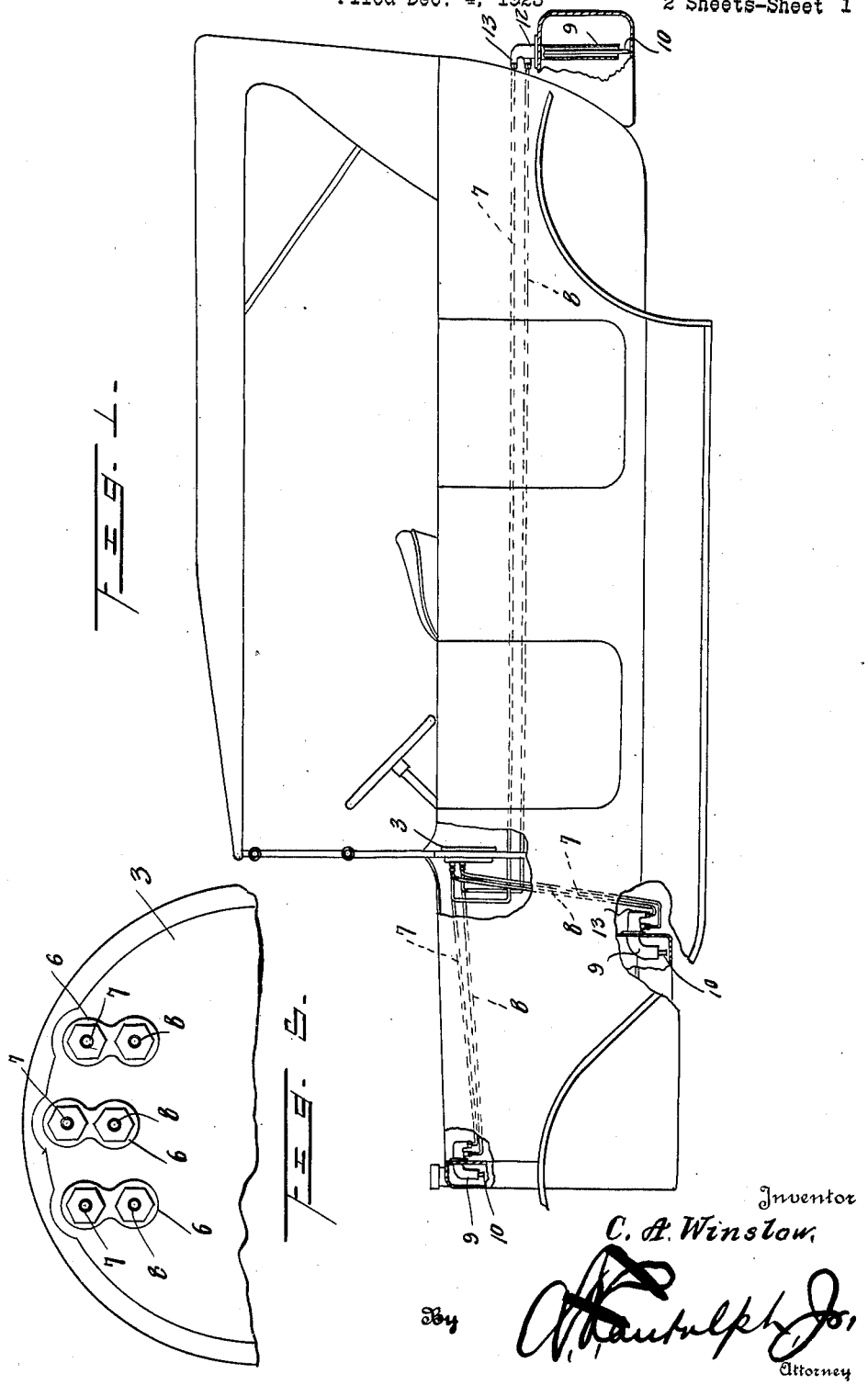

Jan. 24, 1928.  
C. A. WINSLOW  
1,657,330  
LIQUID LEVEL INDICATOR  
Filed Dec. 4, 1923  2 Sheets-Sheet 2
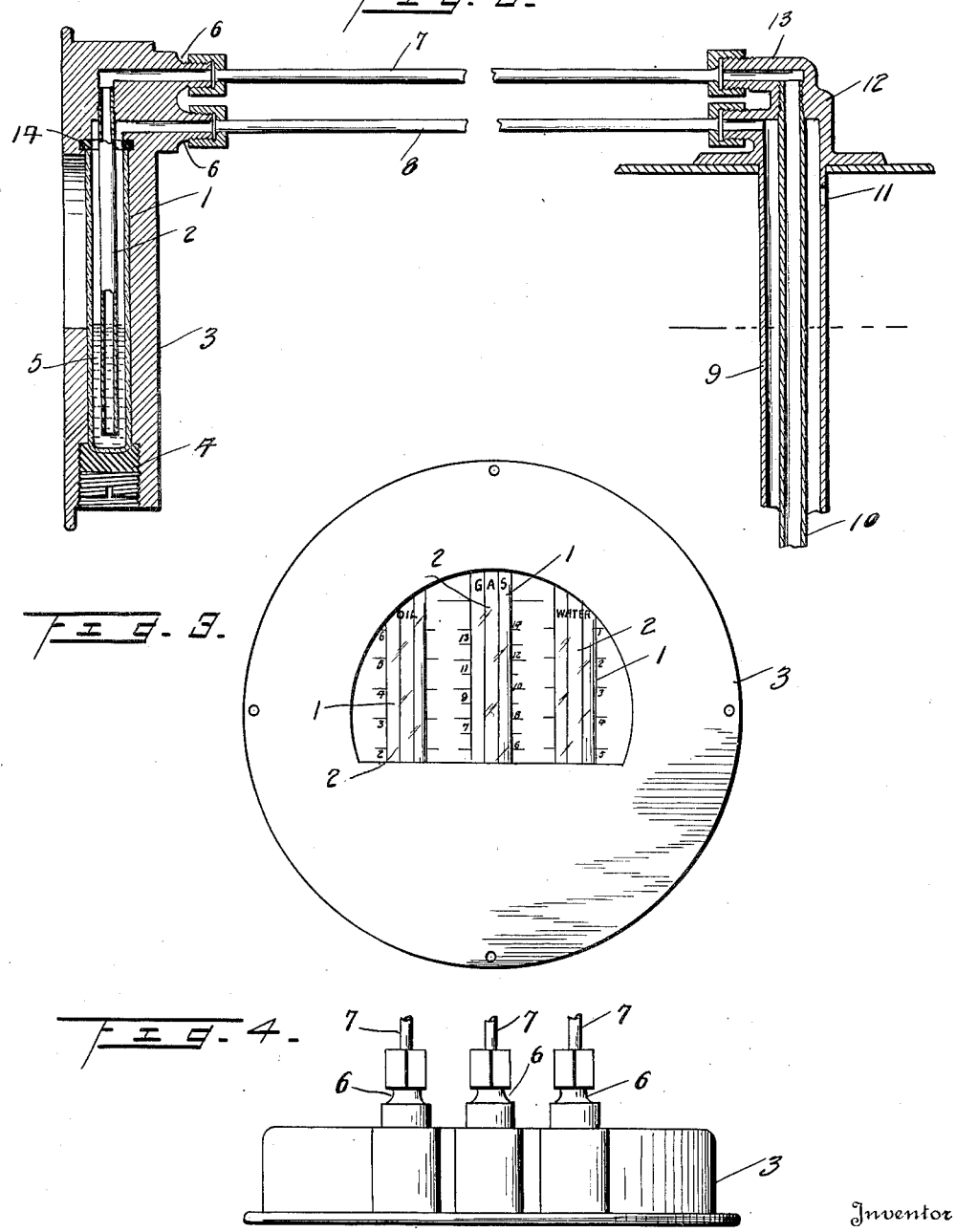
Inventor  
C. A. Winslow,  
By  
Attorney Patented Jan. 24, 1928.

1,657,330

UNITED STATES PATENT OFFICE.

CHARLES A. WINSLOW, OF VALLEJO, CALIFORNIA.

LIQUID-LEVEL INDICATOR.

Application filed December 4, 1923. Serial No. 678,488.

The object of this invention is the provision of an indicator for designating the level of a liquid in a container remotely situated and at a different level than the indicator so that the level of the water in a steam boiler, tank or receptacle may be ascertained at a given point without necessitating an inspection of the boiler gage, or the container holding the liquid and in this respect the invention is particularly adapted for indicating the level of the water in the radiator of a motor vehicle, the level of the oil in the crank case and the level of the gasoline in the fuel tank.

Other objects and advantages will be apparent and suggest themselves as the nature of the invention is understood.

While the drawings illustrate an embodiment of the invention it is to be understood that in adapting the same to meet different conditions and requirements, various changes in the form, proportion and minor details of construction may be resorted to without departing from the nature of the invention.

Referring to the accompanying drawings forming a part of the application:

Figure 1 is a side view of the body portion of an automobile showing the application of the invention, Figure 2 is an enlarged sectional detail, Figure 3 is a front view of the indicator as adapted to be applied to the dash or instrument board of the vehicle, Figure 4 is a top plan view of the indicator, and Figure 5 is a rear view of the upper portion of the indicator.

Corresponding and like parts are referred to in the following description and designated in the several views of the drawings by like reference characters.

In accordance with the present invention, a tube 1 is provided and is closed at its lower end so as to hold a liquid and is open to vent pipe 8 at its upper end. A tube 2 of less diameter than the tube 1 is disposed therein and is open at both ends. In practice a casing 3 is provided to receive the tubes 1 and 2 and has a threaded opening in its bottom portion to receive a plug 4 which holds the tube 1 in place, against a suitable gasket 14, the tube 2 being threaded at its upper end to the top portion of the casing 3. The tube 2 may be of metal or any other preferred material but the tube 1 is preferably of glass to admit of the liquid 5 contained in the lower portion of the tubes 1 and 2 being visible. Suitable calibrations are associated with the tube 1, as indicated most clearly in Figure 3, for ready determination of the level of the liquid 5 in the tube 1. The casing 3 is provided in its rear side with ports, and in alinement with the ports it is provided with coupling extensions 6 to which are connected pipes 7 and 8. The pressure pipe 7 is in communication with the upper end of the tube 2. The vent or equalizing pipe 8 is in communication with the upper end of the tube 1.

Concentric tubes 9 and 10 are disposed within the tank, crank case, radiator or other container holding the liquid, such as fuel, oil or water, the level of which is to be indicated so it may be known in ample time to admit of replenishing and thereby prevent the parts becoming empty or the liquid therein reaching a dangerous low level such as would be the case in a steam boiler or radiator. There is a definite relationship between the tubes 1, 2 and 10 in order to accurately indicate the level of the liquid in the tank or container receiving the tube 10. The tube 9 is vented at its upper end, as indicated at 11, and the pipe 8 is connected thereto. The tube 10 is open at its lower end and is connected at its upper end with the pipe 7. For convenience a fitting 12 is provided with ports and coupling ends 13 which communicate with the ports and to which the pipes 7 and 8 are connected and has the upper ends of the tubes 9 and 10 attached thereto, the tube 9 preferably forming a part of the fitting and the tube 10 having screw thread connection therewith.

A suitable liquid 5 is supplied to the lower portion of the tubes 1 and 2 and normally the level of the liquid is the same in each of the tubes 1 and 2. It is observed that the liquid 5 seals the lower end of the tube 2. When liquid is supplied to the tank or container into which the tubes 9 and 10 extend, the liquid rising in the tube 10 as the tank or container fills compresses the air in the upper portion of the tube 10 and this pressure is transmitted by the pipe 7 to the upper portion of the tube 2, thereby exerting a downward pressure on the liquid contained in the tube 2 and displacing the same which rises in the tube 1. As hereinbefore stated, the tubes 1, 2 and 10 are of such relative proportions that the rise of the liquid in the tube 10 is proportionally the same as the rise of the liquid in the tube 1 and when the tank or container is filled, the liquid 5 has risen in the tube 1 to approximately fill the same, or in other words, the level of the liquid 5 in the tube 1 corresponds to the level of the liquid in the tank or container into which the tube 10 is extended. As the level of the liquid falls in the tube 10, the pressure of air in the upper portion of the tube 10 decreases with the result that the liquid 5 rises in the tube 2 and lowers in the tube 1, thereby indicating the degree of lowering of the liquid in the tank or container.

When the invention is adapted and applied to an automobile, the radiator, crank case and fuel tank are each provided with tubes 9 and 10, as indicated most clearly in Figure 1. The tubes 9 and 10 may be straight or curved according to their particular location. The casing 3 is provided with three sets of indicating tubes, one for the radiator, one for the crank case and one for the fuel tank. This is shown most clearly in Figure 3. To avoid confusion, the several indicating tubes will be properly designated so that upon reference thereto, the level of the liquid in either the radiator, crank case or fuel tank may be determined. The indicator may be located at any convenient point upon the dash or instrument board so as to be readily observed and thereby give warning when the level of the liquid is abnormally low so that the same may be replenished.

What is claimed is:

A liquid level indicator of the character set forth, comprising a casing having a sight opening and provided with upper and lower ports and with coupling extensions communicating with the ports, an open ended tube mounted within the casing extending across said sight opening and communicating at its upper end with the upper port, a transparent sight tube mounted within the casing also extending across said sight opening and surrounding the first tube and having its lower end closed and communicating at its upper end with the lower port, an indicating liquid in said sight tube visible through said sight opening, a container, a fitting connected to the container and provided with upper and lower ports and with coupling ends communicating with the ports, pipes connected to the coupling extensions and to the coupling ends, a tube located within the container and communicating therewith and with the upper port of the fitting, and a second tube located within the container and communicating therewith and with the lower port of the fitting, said second tube surrounding said first tube and provided adjacent the fitting with a vent opening.

In testimony whereof I affix my signature.

CHARLES A. WINSLOW.